(12) United States Patent
Hoch et al.

(10) Patent No.: US 9,965,105 B2
(45) Date of Patent: May 8, 2018

(54) SYSTEMS AND METHODS FOR DETECTING LOW GROUND MASS CONDITIONS IN SENSOR DEVICES

(75) Inventors: David Hoch, Los Gatos, CA (US); Mihai Bulea, Santa Clara, CA (US)

(73) Assignee: Synaptics Incorporated, San Jose, CA (US)

( * ) Notice: Subject to any disclaimer, the term of this patent is extended or adjusted under 35 U.S.C. 154(b) by 884 days.

(21) Appl. No.: 13/339,114

(22) Filed: Dec. 28, 2011

(65) Prior Publication Data

US 2013/0173211 A1 Jul. 4, 2013

(51) Int. Cl.
*G06F 3/044* (2006.01)

(52) U.S. Cl.
CPC .................. *G06F 3/044* (2013.01)

(58) Field of Classification Search
CPC ..................................... G06F 3/044
See application file for complete search history.

(56) References Cited

U.S. PATENT DOCUMENTS

| | | | |
|---|---|---|---|
| 5,945,980 A | 8/1999 | Moissev et al. | |
| 9,545,980 B2 | 1/2017 | Morimoto | |
| 2007/0074913 A1* | 4/2007 | Geaghan et al. | 178/18.06 |
| 2008/0157782 A1 | 7/2008 | Krah | |
| 2008/0158183 A1 | 7/2008 | Hotelling et al. | |
| 2009/0284495 A1 | 11/2009 | Geaghan et al. | |
| 2010/0060608 A1* | 3/2010 | Yousefpor | 345/174 |
| 2010/0292945 A1* | 11/2010 | Reynolds | G06F 3/044 702/65 |
| 2011/0006832 A1 | 1/2011 | Land et al. | |
| 2011/0025629 A1 | 2/2011 | Grivna et al. | |
| 2011/0061949 A1 | 3/2011 | Krah et al. | |
| 2012/0081335 A1 | 4/2012 | Land et al. | |

* cited by examiner

*Primary Examiner* — Mohamed Charioui
*Assistant Examiner* — Catherine Rastovski
(74) *Attorney, Agent, or Firm* — FBFK PC

(57) ABSTRACT

A processing system for an input device includes a sensor module and a determination module. The sensor module includes sensor circuitry and is configured to acquire a first plurality of measurements of change in capacitive coupling between each sensor electrode of a first set of sensor electrodes and a second set of sensor electrodes. The sensor module is further configured to acquire a second plurality of measurements of change in capacitive coupling between each sensor electrode of the second set of sensor electrodes and an input object. The determination module is configured to determine a first combined measurement based on the first plurality of measurements, determine a second combined measurement based on the second plurality of measurements, and determine positional information for the input object based on a low ground mass parameter. The low ground mass parameter is based on the first combined measurement and the second combined measurement.

19 Claims, 6 Drawing Sheets

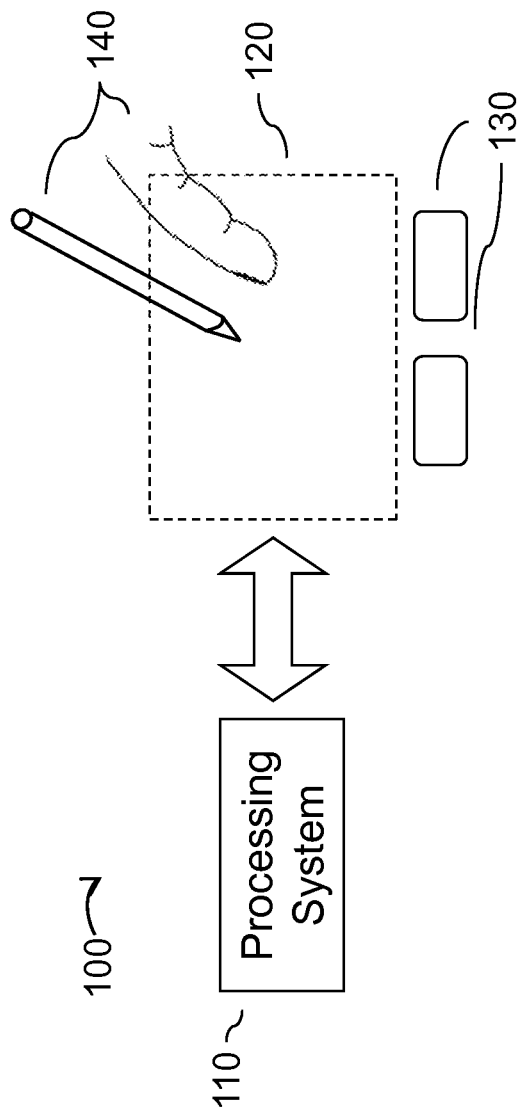

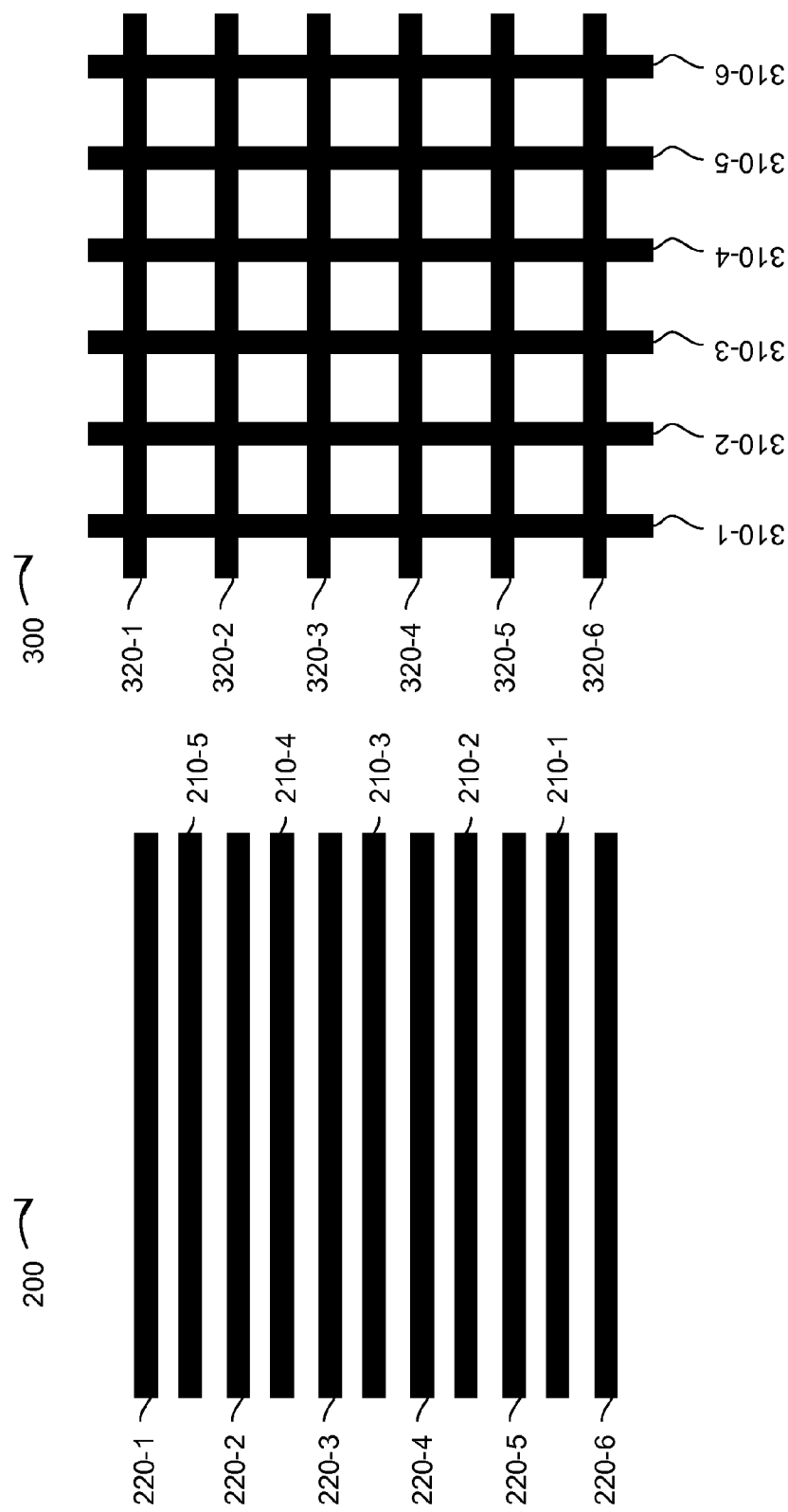

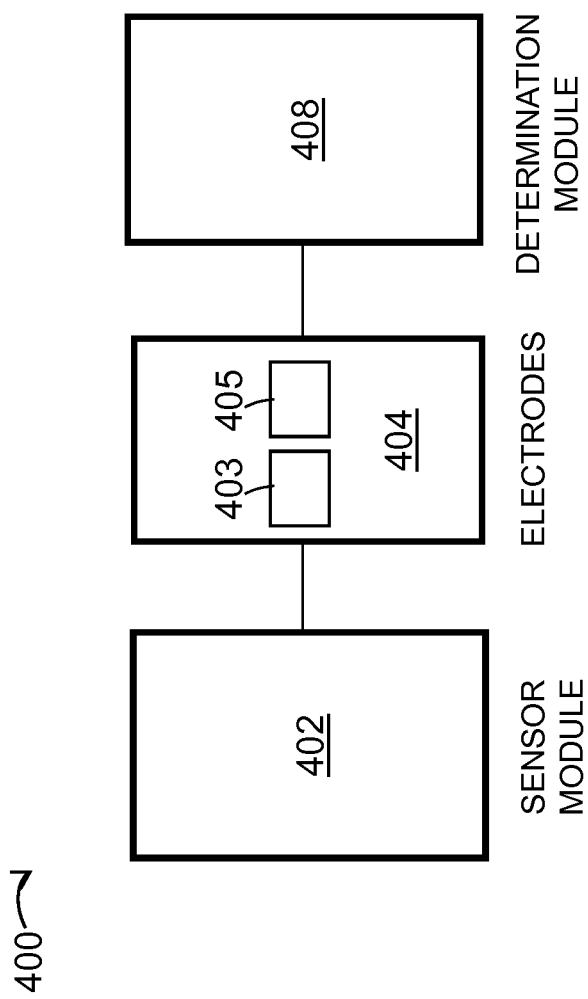

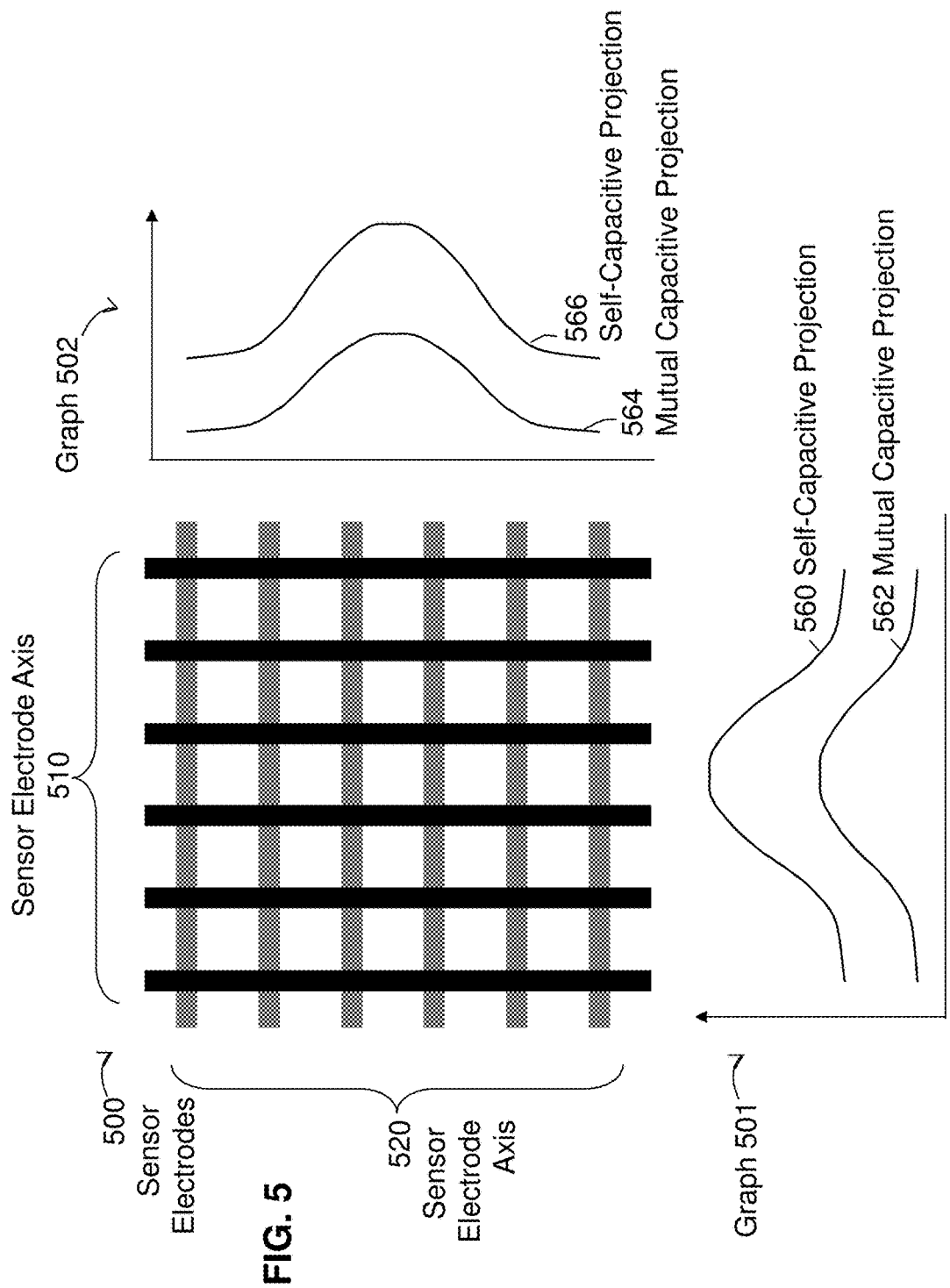

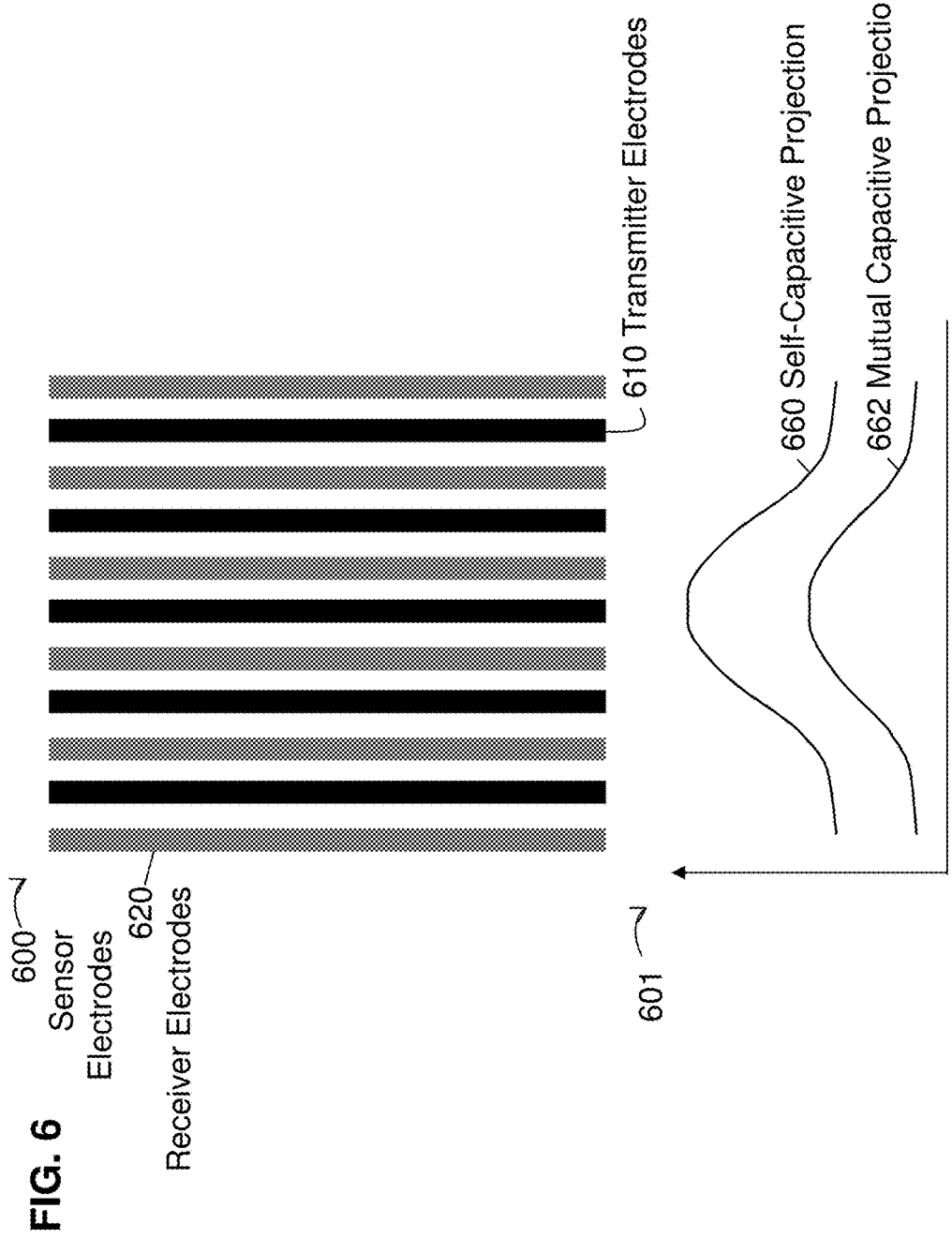

SYSTEMS AND METHODS FOR DETECTING LOW GROUND MASS CONDITIONS IN SENSOR DEVICES

FIELD OF THE INVENTION

This invention generally relates to electronic devices, and more specifically relates to sensor devices.

BACKGROUND OF THE INVENTION

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers).

Input devices may employ transcapacitance (or "mutual capacitance") to determine a change in capacitive coupling relating to the presence of an input object in a sensing region. In such cases, when the grounding condition of the input device is low or otherwise non-optimal (e.g., when the input device is lying on a desk, rather than being held by a user), certain parasitic capacitance effects may result in signal artifacts and/or produce other deleterious results. In general, this may referred to as a "low ground mass" condition.

Accordingly, there is a need for improved sensor systems and methods capable of addressing issues related to low ground mass conditions.

BRIEF SUMMARY OF THE INVENTION

In accordance with one embodiment of the present invention, a processing system for an input device includes a sensor module and a determination module. The sensor module comprises sensor circuitry and is configured to acquire a first plurality of measurements of change in capacitive coupling between each sensor electrode of a first set of sensor electrodes and a second set of sensor electrodes. The sensor module is further configured to acquire a second plurality of measurements of change in capacitive coupling between each sensor electrode of the second set of sensor electrodes and an input object. The determination module is configured to determine a first combined measurement based on the first plurality of measurements, determine a second combined measurement based on the second plurality of measurements, and determine positional information for the input object based on a low ground mass parameter, wherein the low ground mass parameter is based on the first combined measurement and the second combined measurement.

A capacitive sensor device in accordance with one embodiment of the invention comprises a first set of electrodes, a second set of electrodes, and a processing system communicatively coupled to the first set of electrodes and the second set of electrodes. The processing system is configured to acquire a first plurality of measurements of change in capacitive coupling between each sensor electrode of a first set of sensor electrodes and a second set of sensor electrodes, acquire a second plurality of measurements of change in capacitive coupling between each sensor electrode of the second set of sensor electrodes and an input object, determine a first combined measurement based on the first plurality of measurements, determine a second combined measurement based on the second plurality of measurements, and determine positional information for the input object based on a low ground mass parameter, wherein the low ground mass parameter is based on the first combined measurement and the second combined measurement.

A method in accordance with one embodiment of the invention includes acquiring a first plurality of measurements of change in capacitive coupling between each sensor electrode of a first set of sensor electrodes and a second set of sensor electrodes, acquiring a second plurality of measurements of change in capacitive coupling between each sensor electrode of the second set of sensor electrodes and an input object, determining a first combined measurement based on the first plurality of measurements, determining a second combined measurement based on the second plurality of measurements, and determining positional information for the input object based on a low ground mass parameter, wherein the low ground mass parameter is based on the first combined measurement and the second combined measurement.

BRIEF DESCRIPTION OF DRAWINGS

The present invention will hereinafter be described in conjunction with the appended drawings, where like designations denote like elements, and:

FIG. 1 is a block diagram of an example system that includes an input device in accordance with an embodiment of the invention;

FIG. 2 is a conceptual block diagram depicting an example electrode pattern;

FIG. 3 is a conceptual block diagram depicting an example electrode pattern;

FIG. 4 is a conceptual block diagram of one embodiment of the invention;

FIG. 5 is a conceptual diagram depicting an example electrode pattern and a corresponding qualitative graph of example combined measurements;

FIG. 6 is a conceptual diagram depicting an example electrode pattern and a corresponding qualitative graph of example combined measurements;

DETAILED DESCRIPTION OF THE INVENTION

Figure 7:
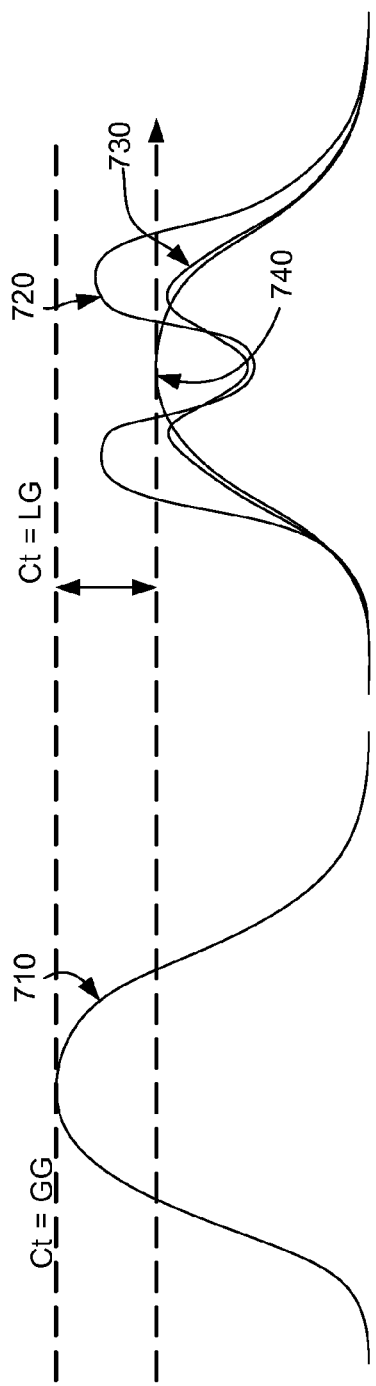
FIG. 7 illustrates example projections.

The following detailed description is merely exemplary in nature and is not intended to limit the invention or the application and uses of the invention. Furthermore, there is no intention to be bound by any expressed or implied theory presented in the preceding technical field, background, brief summary, or the following detailed description.

FIG. 1 is a block diagram of an exemplary input device 100, in accordance with embodiments of the invention. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include I²C, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1.

Sensing region 120 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g. a touch surface) of the input device 100, contact with an input surface of the input device 100 coupled with some amount of applied force or pressure, and/or a combination thereof. In various embodiments, input surfaces may be provided by surfaces of casings within which sensor electrodes reside, by face sheets applied over the sensor electrodes or any casings, etc. In some embodiments, the sensing region 120 has a rectangular shape when projected onto an input surface of the input device 100.

The input device 100 may utilize any combination of sensor components and sensing technologies to detect user input in the sensing region 120. The input device 100 comprises one or more sensing elements for detecting user input. As several non-limiting examples, the input device 100 may use capacitive, elastic, resistive, inductive, magnetic, acoustic, ultrasonic, and/or optical techniques.

Some implementations are configured to provide images that span one, two, three, or higher dimensional spaces. Some implementations are configured to provide projections of input along particular axes or planes.

In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements pick up loop currents induced by a resonating coil or pair of coils. Some combination of the magnitude, phase, and frequency of the currents may then be used to determine positional information.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. In various embodiments, the transmitter electrode may be driven such that a voltage variation is produced across the transmitter electrode. For example, a first end of the transmitter electrode may be modulated in a first way while a second end of the transmitter electrode may be modulated similar to the first end, modulated differently from the first end or driven with a substantially constant voltage. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g. other electromagnetic signals). Sensor electrodes may be dedicated transmitters or receivers, or may be configured to both transmit and receive.

In this regard, FIGS. 2 and 3 illustrate, conceptually, example sets of capacitive sensor electrodes 200 and 300 configured to sense in a sensing region (e.g., sensing region 120). For clarity of illustration and description, FIG. 2 shows a pattern of simple rectangles arranged substantially parallel to each other, and FIG. 3 shows a pattern of simple rectangles arranged substantially perpendicular to each other. In various embodiments, capacitive sensor electrodes 200 of FIG. 2 and the capacitive sensor electrodes 300 of FIG. 3 are configured to perform as a "gradient" sensor, in which a voltage variation is produced in the electrodes. The voltage variations may be linear, non-linear, piecewise linear, smooth (differentiable), non-smooth, monotonic, or be characterized by any other desired mathematical function. In some embodiments, capacitive sensor electrodes 300 of FIG. 3 are configured to perform as capacitive "image" sensor. It will be appreciated, however, that the invention is not so limited, and that a variety of electrode patterns and shapes may be suitable in any particular embodiment.

Sensor electrodes 210 and 220 of FIG. 2 are typically ohmically isolated from each other, as are sensor electrodes 310 and 320 of FIG. 3. In some embodiments, such sensor electrodes are separated from each by one or more substrates. For example, they may be disposed on opposite sides of the same substrate, or on different substrates that are laminated together.

In the embodiment depicted in FIG. 2, some sensor electrodes 210 (e.g., 210-1, 210-2, etc.) are configured as receiver electrodes, and some sensor electrodes 220 (e.g., 220-1, 220-2, etc.) are configured as transmitter electrodes. Similarly, in FIG. 3, some sensor electrodes 310 (e.g., 310-1, 310-2, etc.) are configured as receiver electrodes, and some sensor electrodes 320 (e.g., 320-1, 320-2, etc.) are configured as transmitter electrodes. The capacitive coupling between the transmitter electrodes and receiver electrodes change with the proximity and motion of input objects in the sensing region associated with the transmitter electrodes and receiver electrodes. In each of the illustrated embodiments (as well as other exemplary embodiments) the receiver sensor electrodes may be operated singly or multiply to acquire resulting signals. The resulting signals may be used to determine a "capacitive frame" representative of measurements of the capacitive couplings. Multiple capacitive frames may be acquired over multiple time periods, and differences between them used to derive information about input in the sensing region. For example, successive capacitive frames acquired over successive periods of time can be used to track the motion(s) of one or more input objects entering, exiting, and within the sensing region.

In some embodiments, a sensor pattern is "scanned" to determine the capacitive couplings. That is, the transmitter electrodes are driven such that they transmit transmitter signals. Transmitters may be operated such that one transmitter electrode transmits at one time, or multiple transmitter electrodes transmit at the same time. Where multiple transmitter electrodes transmit simultaneously, these multiple transmitter electrodes may transmit the same transmitter signal and effectively produce an effectively larger transmitter electrode, or multiple transmitter electrodes may transmit different transmitter signals. For example, multiple transmitter electrodes may transmit different transmitter signals according to one or more coding schemes that enable their combined effects on the resulting signals of receiver electrodes to be independently determined.

In some embodiments, the transmitted signals are substantially orthogonal in terms of time, frequency, or the like—i.e., exhibit very low cross-correlation, as is known in the art. In this regard, two signals may be considered substantially orthogonal even when those signals do not exhibit strict, zero cross-correlation. In a particular embodiment, for example, the transmitted signals are based on pseudo-random sequence codes. In other embodiments, Walsh codes, Gold codes, or another appropriate quasi-orthogonal or orthogonal codes are used.

Referring again to FIG. 1, processing system 110 is shown as part of the input device 100. The processing system 110 is configured to operate the hardware of the input device 100 to detect input in the sensing region 120. The processing system 110 comprises parts of or all of one or more integrated circuits (ICs) and/or other circuitry components. For example, as described in further detail below, a processing system for a mutual capacitance sensor device may comprise transmitter circuitry configured to transmit signals with transmitter sensor electrodes, and/or receiver circuitry configured to receive signals with receiver sensor electrodes). In various embodiments, as described in further below, a processing system for a mutual capacitance sensor device may comprise transmitter circuitry configured to drive a first and second end of a transmitter electrode such that the transmitter electrode exhibits differing voltage gradients extending from the first end to the second end of the transmitter electrode and a receiver module configured to receive resulting signals with receiver electrodes when the transmitter electrode exhibits the voltage gradients.

In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like. In one embodiment, processing system 110 includes determination circuitry configured to determine positional information for an input device based on the measurement.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120, or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system 110.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system 110). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Referring now to the conceptual block diagram depicted in FIG. 4, various embodiments of an exemplary processing system 110 as shown in FIG. 1 may include a system 400. System 400, as illustrated, generally includes sensor module 402 communicatively coupled via a set of sensor electrodes (or simply "electrodes") 404 to determination module 408. Sensor electrodes 404 include one or more transmitter electrodes 403 and one or more receiver electrodes 405. In some embodiments, for example, sensor electrodes 404 are configured as depicted in FIGS. 2 and 3, described above.

Sensor module 402 includes any combination of hardware and/or software configured to acquire a first plurality of measurements of change in capacitive coupling between each sensor electrode of a first set of sensor electrodes (e.g., electrodes 403) and each sensor electrode of a second set of sensor electrodes (e.g., electrodes 405), and acquire a second plurality of measurements of change in capacitive coupling between each sensor electrode of the second set of sensor electrodes and an input object. In some embodiments, the first plurality of measurements correspond to what is often referred to as "transcapacitance," and the second plurality of measurements correspond to what is often referred to as "absolute capacitance," both of which are described in detail above. In one embodiment, the first plurality of measurements and the second plurality of measurements are acquired substantially simultaneously. In other embodiments, the first plurality of measurements and the second plurality of measurements are acquired sequentially. In some embodiments, the first and second plurality of measurements are acquired in an interlaced manner, for example, in a pattern such as 'ababababab . . . ', where in one embodiment 'a' denotes a portion of one of the first plurality of measurements, and 'b' denotes a portion of the second plurality of measurements. In another embodiment, 'a' denotes a portion of the second plurality of measurements, and 'b' denotes a portion of the first plurality of measurements. In various embodiments, multiple portions of one of the first plurality of measurements and/or of one of the second plurality of measurements may be acquired. Further, in other embodiments, the first and second pluralities of measurements are acquired in an interlaced manner, such that they are acquired in an "unbalanced" manner—for example, in a pattern such as 'aabaabaab . . . ', 'abbabbabba . . . ', 'abbaabaabba . . . ', 'aababbaabbb . . . ', or the like.

Determination module 408 generally includes any combination of hardware and/or software configured to determine a first combined measurement based on the first plurality of measurements, determine a second combined measurement based on the second plurality of measurements, and determine positional information for an input object based on a low ground mass parameter that is based on the first combined measurement and the second combined measurement.

The term "combined measurement" generally refers to measurements that are combined in any manner suitable for use in determining the low ground mass parameter, which is described in further detail below. In various embodiments, the measurements may be summed, averaged, convolved, or passed through one or more arbitrary mathematical functions. In one embodiment, for example, the first combined measurement includes a first projection corresponding to a projection of the first plurality of measurements, and the second combined measurement includes a second projection corresponding to a projection of the second plurality of measurements.

More particularly, referring now to FIG. 5, a set of sensor electrodes 500 may include sensor electrodes 510 and receiver electrodes 520 configured substantially perpendicular as described previously in connection with FIG. 3. Exemplary qualitative graphs 501 and 502 are shown aligned horizontally and vertically, respectively, with the set of sensor electrodes 500. In each of the graphs 501 and 502, the abscissa axis corresponds to a spatial dimension along the set of sensor electrodes 500, and the ordinate axis corresponds to a magnitude of the combined measurement or measurements (e.g., a projection) associated with sensor electrodes 500.

For purposes of illustration, graph 501 includes projections 560 and 562 associated with the presence of an input object, not shown, and graph 502 includes projections 564 and 566. Projections 562 and 564 may correspond to the first combined measurement (e.g., a measurement of change in transcapacitive coupling), and projections 560 and 566 may correspond to the second combined measurement (e.g., a measurement in change in absolute capacitive coupling). The term "projection" is used herein in the general sense, and in various embodiments may refer to a summation of measurements or an orthogonal "side view" projection. For example, in one embodiment, projection 562 may be produced by summing measurements between each sensor electrode of sensor electrodes 510 and each sensor electrode of sensor electrodes 520 along the long axis of each sensor electrode of sensor electrodes 510. In other embodiments, projection 562 corresponds to a projection of the maximum measurement between each sensor electrode of sensor electrodes 510 and each sensor electrode of sensor electrodes 520 along the long axis of each sensor electrode of sensor electrodes 510. In various embodiments, projection 560 corresponds to measurements between each sensor electrode of sensor electrodes 510 and an input object. In other embodiments, projection 564 may be produced by summing measurements between each sensor electrode of sensor electrodes 510 and each sensor electrode of sensor electrodes 520 along the long axis of each sensor electrode of sensor electrodes 520. In other embodiments, projection 564 corresponds to a projection of the maximum measurement between each sensor electrode of sensor electrodes 510 and each sensor electrode of sensor electrodes 520 along the long axis of each sensor electrode of sensor electrodes 520. In various embodiments, projection 566 corresponds to measurements between each sensor electrode of sensor electrodes 520 and an input object. While projections 560, 562, 564 and 566 are shown as being along the long axis of sensor electrodes 510 and 520, the projections may be along any other direction. For example, projections may correspond to a summation of the capacitive measurements along any angle. Further, while the projections 560, 562, 564 and 566 are shown as analog representation, this is not intended to be limiting, and they may also be discrete values. In various embodiments, the projections in one or both of graphs 501 and 502 may be used in determining the low ground mass parameter. It will be appreciated that the exemplary projections depicted in FIG. 5 are not intended to limit the scope of the invention with respect to shape, magnitude, size, scale, relationship, polarity, or any other characteristic.

FIG. 6 depicts another embodiment in which a set of sensor electrodes 600 includes transmitter electrodes 610 and receiver electrodes 620 configured substantially parallel to each other, as described previously in connection with FIG. 4. As with FIG. 5, an exemplary qualitative graph 601 is shown aligned with the set of electrodes 600. Projection 662 may correspond to the first combined measurement (e.g., a measurement of a change in transcapacitive coupling), and projection 660 may correspond to the second combined measurement (e.g., a measurement of change in absolute capacitive coupling). In one embodiment, projection 662 corresponds to a projection of measurements of change in capacitive coupling between sensor electrodes 610 and sensor electrodes 610. Further, projection 660 corresponds to a projection of measurements of change in capacitive coupling between sensor electrodes 610 or sensor electrodes 620 and an input object.

In one embodiment, the low ground mass parameter is based on a difference in the first combined measurements and the second combined measurements. For example, the low ground mass parameter is based on a different in shape (or "geometry") between the first projection and the second projection. For example, in graph 501, the shapes of projections 560 and 562 may be compared in terms of, for example, inflection points, flatness, aspect ratio, proportionality or any other convenient geometrical attribute.

In another embodiment, the low ground mass parameter is based on a difference in amplitude between the first projection and the second projection. For example, in graph 501, projections 560 and 562 may be compared in terms of, for example, average magnitude, peak magnitude, area under the curve, or the like. In some embodiments, the low ground mass parameter is based on both shape and amplitude differences between the projections. In one embodiment, the low ground mass parameter is based on a proportionality factor determined between the first projection and the second projection.

FIG. 7 illustrates example projections 710, 720, 730 and 740. Projection 710 may represent a projection under a good ground mass condition and projections 720, 730 and 740 may represent projections under a low ground mass condition. As can be seen from projections 720, 730, and 740, projections corresponding to a low ground mass condition may have a different amplitude and or shape from projections corresponding to good ground mass conditions. Projection 740 illustrates that under some low ground mass conditions, the amplitude of the projection may be decreased. Projections 720 and 730 illustrate that under some low ground mass conditions, a projection may have a different shape and/or amplitude. As also can be seen from projections 720 and 730, a projection corresponding to a low ground mass condition may have more than one peak.

Figure 8:
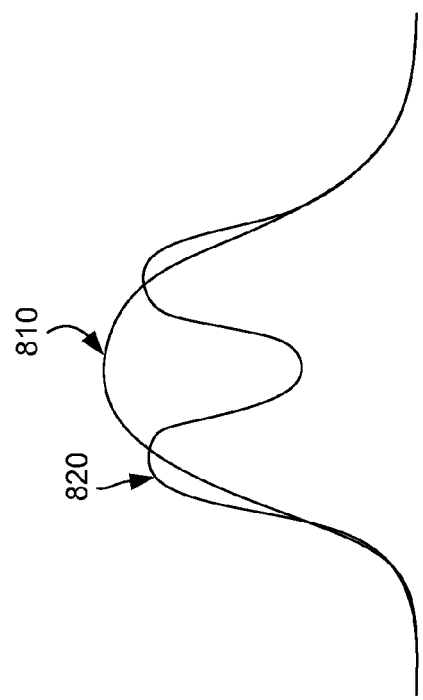
FIG. 8 illustrates a comparison.

FIG. 8 illustrates a comparison between a projection corresponding to measurements of change in capacitive coupling between a first set and second set of sensor electrodes, projection 820, and a projection corresponding to measurements of change in capacitive coupling between the first set of sensor electrodes and an input object, projection 810, under low ground mass conditions. As illustrated, projection 820 differs from projection 810, and as described above, the low ground mass parameter may be based on the differences between the projections.

In one embodiment, the positional information for the input object is based on the low ground mass parameter and the first plurality of measurements. For example, the low ground mass parameter may be used to adjust raw data, processed data, coordinate information (including absolute position, relative position data and the like), velocity, acceleration, other types of spatial information, historical data related to the first plurality of measurements and in the determination of ghost fingers. In such embodiments, the low ground mass parameter may be determined based on the first combined measurements and the second combined measurements. Once the low ground mass parameter is determined, it may be used to adjust features related to the first plurality of measurements. In various embodiments, this may include correcting for errors in the first plurality of measurements.

In one embodiment, the positional information for the input object is selectably based on at least one of the low ground mass parameter and the first plurality of measurements. For example, the determination module 408 may be configured to base the positional information on the low ground mass parameter when the low ground mass parameter meets a particular criterion or set of criteria, and otherwise base the positional information on the first plurality of measurements alone. The predetermined criterion or criteria may be based, for example, on any of the shape or magnitude-related attributes described above. Stated another way, when the input device is not subject to a low ground mass condition (ground is "good"), then the first plurality of measurements (e.g., based on tranconductance) may be used for positional information. However, when the input device is subject to a low ground mass condition, then the positional information is based on the low ground mass parameter and perhaps other factors such as the second plurality of measurements (e.g., based on absolute capacitance).

In one embodiment, the positional information for the input object may be determined based on a model applied to the low ground mass parameter and at least one of the first projection and the second projection. In another embodiment, the positional information for the input object may be determined based on a model applied to the low ground mass parameter, the first projection and the second projection. That is, an analytic or empirical model may be developed a priori to characterize the extent to which a low ground mass condition can affect the positional information sensed via the first plurality of measurements. Once this model is determined, the determination module may later use that model to substantially reconstruct or otherwise estimate what the first projection (e.g., the transcapacitive measurements) would have looked like had the input device not been subject to a low ground mass condition.

Furthermore, in various embodiments, the processing system is configured to determine an operational state of the input device based on the low ground mass parameter. In one embodiment, for example, the operational state of the input device corresponds to whether the first plurality of measurements, the second plurality of measurements, and the low ground mass parameter is used for determining positional information (as described above).

In one embodiment, the operational state of the input device corresponds to whether or not positional information is for the input object is based on a model applied to the low ground mass parameter, the first projection, and/or the second projection.

In one embodiment, the operational state of the input device corresponds to number of input objects the input device may track in the sensing region. For example, when the input device is in a low ground mass condition, the number of input objects that may be tracked may be decreased. This may include allowing only a single input object to be tracked or small smaller set than that that may be tracked under good ground conditions. In other embodiments, the operational state of the input device corresponds to whether the input device should determine positional information based on the first plurality of measurements or the second plurality of measurements. When the input device is determined to be operating under a low ground mass condition, the input device may determine positional information for an input object based on the second plurality of measurements (i.e., measurement of change in absolute capacitive coupling). When the input device is determined to be operating under a good ground mass condition, the input device may determine positional information for an input object based on the first plurality of measurements (i.e., measurement of change in transcapacitive coupling).

In another embodiment, the operational state of the input device corresponds to whether the input device should operate in a "normal" matter or should provide some form of notification to the user that the input device is in a low ground mass condition. For example, an auditory, tactile, visual, and/or other notification may be employed. Such notification may also provide the user with an option to ignore the condition and/or allow the user to change a configuration setting designating whether and to what extent the input device should attempt to compensate for the low ground mass condition. Further, such notification may allow the user to manually restrict the number of input objects that may be tracked.

The term "low ground mass coefficient" as used herein generally refers to any combination of scalar and/or vector values suitable for characterizing the ground condition of the input device. In accordance with one embodiment, the low ground mass coefficient is based on the free-space capacitive coupling to the universe. In various embodiments, the ground condition of the input device corresponds to free-space capacitive coupling in series between the input device-universe and the input object-universe. In various embodiments, when the coupling between the input device and the universe (free-space coupling coefficient), is relatively small, the device may be considered to be in a low ground mass state. However, when the coupling between the capacitive sensing device and the universe is substantially larger, the device may be considered to be operating in a good ground mass state. Further, when the coupling between an input object and system ground of the input device is substantially large, the input device may be in a good ground mass condition.

Accordingly, in various embodiments, the low ground mass parameter is based on at least one of the low ground mass coefficient, the free-space coupling coefficient, the first sensor electrode coupling coefficient, and the second sensor electrode coupling coefficient. In one embodiment, the free-space coupling coefficient corresponds to the free-space capacitive coupling in series between the input device-universe and the input object-universe. In one embodiment, the first sensor electrode coupling coefficient corresponds to the capacitive coupling between an input object and a transmitter electrode. In another embodiment, the first sensor electrode coupling coefficient corresponds to the capacitive coupling between an input object and the plurality of transmitter electrodes. In one embodiment, the second sensor electrode coupling coefficient corresponds to the capacitive coupling between an input object and a receiver electrode. In another embodiment, the second sensor electrode coupling coefficient corresponds to the capacitive coupling between an input object and the plurality of receiver electrodes. In a particular embodiment, for example, the low ground mass parameter is based on a combination of the first sensor electrode coupling coefficient, the second sensor electrode coupling coefficient, and the free space coupling coefficient.

In one embodiment, the sensor module 402 is further configured to acquire a third plurality of measurements of change in capacitive coupling between each sensor electrode of the first set of sensor electrodes and the input object, and the determination module 408 is further configured to determine a third combined measurement based on the third plurality of measurements. Thus, the low ground mass parameter may be further based on the third combined measurement. In one embodiment a third and fourth combined measurements are acquired. FIG. 5, for example, depicts third and fourth combined measurements as projections 564 and 566. For example, as described in relation to the first combined measurements and the second combined measurements, the low ground mass parameter may be further based on a difference in the third combined measurements and the fourth combined measurements.

Thus, the embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

The invention claimed is:

1. A processing system for an input device, the processing system comprising:
a sensor module comprising sensor circuitry, the sensor module configured to:
acquire a first plurality of mutual capacitive measurements of change in capacitive coupling between a set of transmitter sensor electrodes and a set of receiver sensor electrodes, wherein acquiring the first plurality of mutual capacitive measurements comprises driving the set of transmitter sensor electrodes and receiving resulting signals using the set of receiver sensor electrodes;
acquire a second plurality of self-capacitive measurements by modulating a signal on the set of receiver sensor electrodes with respect to a first reference voltage and detecting a capacitive coupling between the set of receiver sensor electrodes and an input object; and
acquire a third plurality of self capacitance measurements by modulating a signal on the set of transmitter sensor electrodes with respect to a second reference voltage and detecting a capacitive coupling between the set of transmitter sensor electrodes and the input object; and a determination module configured to:
determine a first combined measurement using the first plurality of mutual capacitance measurements;
determine a second combined measurement using the second plurality of self capacitance measurements;
determine a third combined measurement based on the third plurality of self capacitance measurements; and
determine positional information for the input object based on a low ground mass parameter, the low ground mass parameter identifying free-space capacitive coupling of the input device, wherein the low ground mass parameter is based on a comparison of the first combined measurement and the second combined measurement, and wherein the low ground mass parameter is further based on the third combined measurement.

2. The processing system of claim 1, wherein the determination module is further configured to determine the positional information for the input object based on the first plurality of mutual capacitance measurements and wherein the determination module is configured to determine the positional information for the input object selectably based on at least one of the low ground mass parameter and the first plurality of mutual capacitance measurements.

3. The processing system of claim 2, wherein the determination module is configured to base the position information on the low ground mass parameter when the low ground mass parameter meets a criterion.

4. The processing system of claim 1, wherein the low ground mass parameter is based on at least one of:
a low ground mass coefficient;
a free-space coupling coefficient;
a first sensor electrode coupling coefficient corresponding to capacitive coupling of the input object to the set of transmitter sensor electrodes; and
a second sensor electrode coupling coefficient corresponding to capacitive coupling of the input object to the set of receiver sensor electrodes.

5. The processing system of claim 4, wherein the low ground mass parameter is based on a combination of the first sensor coupling coefficient, the second sensor coupling coefficient, and the free space coupling coefficient.

6. The processing system of claim 1, wherein the first combined measurement comprises a first projection of the first plurality of mutual capacitance measurements, wherein the first projection comprises a summation, for each sensor electrode on an axis, of the first plurality of mutual capacitive measurements, and the second combined measurement comprises the second plurality of self capacitance measurements for each sensor electrode on the axis.

7. The processing system of claim 6, wherein the low ground mass parameter is based on at least one of a difference in shape and a difference in amplitude between the first projection and the second projection.

8. The processing system of claim 6, wherein determining the positional information for the input object based on the low ground mass parameter comprising determining the positional information for the input object based on a model applied to the low ground mass parameter and at least one of the first projection and the second projection.

9. The processing system of claim 1, wherein the first plurality of mutual capacitance measurements and the second plurality of self capacitance measurements are acquired simultaneously.

10. The processing system of claim 1, wherein the set of transmitter sensor electrodes is parallel to the set of receiver sensor electrodes or perpendicular to the set of receiver sensor electrodes.

11. The processing system of claim 1, wherein the processing system is configured to determine an operational state of the input device based on the low ground mass parameter.

12. A capacitive sensor device comprising:
a set of transmitter electrodes;
a set of receiver electrodes; and
a processing system communicatively coupled to the first set of electrodes and the second set of electrodes, the processing system configured to:
acquire a first plurality of mutual capacitance measurements of change in capacitive coupling between the set of transmitter sensor electrodes and the set of receiver sensor electrodes, wherein acquiring the first plurality of mutual capacitive measurements comprises driving the set of transmitter sensor electrodes and receiving resulting signals using the set of receiver sensor electrodes; and
acquire a second plurality of self capacitance measurements by modulating a signal on the set of receiver sensor electrodes with respect to a first reference voltage and detecting a capacitive coupling between the set of receiver sensor electrodes and an input object;
acquire a third plurality of self capacitance measurements by modulating a signal on the set of transmitter sensor electrodes with respect to a second reference voltage and detecting a capacitive coupling between the set of transmitter sensor electrodes and the input object;
determine a first combined measurement using the first plurality of mutual capacitance measurements;
determine a second combined measurement using the second plurality of self capacitance measurements;
determine a third combined measurement based on the third plurality of self capacitance measurements; and
determine positional information for the input object based on a low ground mass parameter, the low ground mass parameter identifying a free-space capacitive coupling of the input device, wherein the low ground mass parameter is based on a comparison of the first combined measurement and the second combined measurement, and wherein the low ground mass parameter is further based on the third combined measurement.

13. The capacitive sensor device of claim 12, wherein the processing system is further configured to determine the positional information for the input object based on the first plurality of mutual capacitance measurements and wherein the processing system is configured to determine the positional information for the input object selectably based on at least one of the low ground mass parameter and the first plurality of mutual capacitance measurements.

14. The capacitive sensor device of claim 12, wherein the low ground mass parameter is based on at least one of:
a low ground mass coefficient;
a free-space coupling coefficient;
a first sensor coupling coefficient corresponding to capacitive coupling of the input object to the set of transmitter sensor electrode; and
a second sensor coupling coefficient corresponding to capacitive coupling of the input object to the set of receiver sensor electrodes.

15. The processing system of claim 12, wherein determining the positional information for the input object based on a low ground mass parameter comprising determining the positional information for the input object based on a model applied to the low ground mass parameter and a projection, wherein the projection comprises a summation, for each sensor electrode on an axis, of the first plurality of mutual capacitive measurements.

16. A method of capacitive sensing, the method comprising:
acquiring a first plurality of mutual capacitance measurements of change in capacitive coupling between a set of transmitter sensor electrodes and a set of receiver sensor electrodes, wherein acquiring the first plurality of mutual capacitive measurements comprises driving the set of transmitter sensor electrodes and receiving resulting signals using the set of receiver sensor electrodes;
acquiring a second plurality of self capacitance measurements by modulating a signal on the set of receiver sensor electrodes with respect to a first reference voltage and detecting a capacitive coupling between the set of receiver sensor electrodes and an input object;
acquiring a third plurality of self capacitance measurements by modulating a signal on the set of transmitter sensor electrodes with respect to a second reference voltage and detecting a capacitive coupling between the set of transmitter sensor electrodes and the input object;
determining a first combined measurement using the first plurality of mutual capacitance measurements;
determining a second combined measurement using the second plurality of self capacitance measurements;
determine a third combined measurement based on the third plurality of self capacitance measurements; and
determining positional information for the input object based on a low ground mass parameter, the low ground mass parameter identifying a free-space capacitive coupling of the input device, wherein the low ground mass parameter is based on a comparison of the first combined measurement and the second combined measurement, and wherein the low ground mass parameter is further based on the third combined measurement.

17. The method of claim 16, wherein:
determining the first combined measurement comprises determining a first projection corresponding to a projection of the first plurality of mutual capacitance measurements, wherein the first projection comprises a summation, for each sensor electrode on an axis, of the first plurality of mutual capacitive measurements;
determining the second combined measurement comprises the second plurality of self capacitance measurements for each sensor electrode on the axis; and
determining the positional information for the input object comprises applying a model to the low ground mass parameter and at least one of the first projection and the second projection.

18. The method of claim 16, wherein the low ground mass parameter is based on at least one of:
a low ground mass coefficient;
a free-space coupling coefficient;
a first sensor coupling coefficient corresponding to capacitive coupling of the input object to the set of transmitter sensor electrode; and
a second sensor coupling coefficient corresponding to capacitive coupling of the input object to the set of receiver sensor electrodes.

19. The method of claim 16, wherein the low ground mass parameter is based on at least one of a difference in shape and a difference in amplitude between the first projection and the second projection.

* * * * *